June 27, 1950
C. M. LEAMAN
2,513,186
ROTARY SPIRAL TILLER
Filed April 6, 1945
2 Sheets-Sheet 2
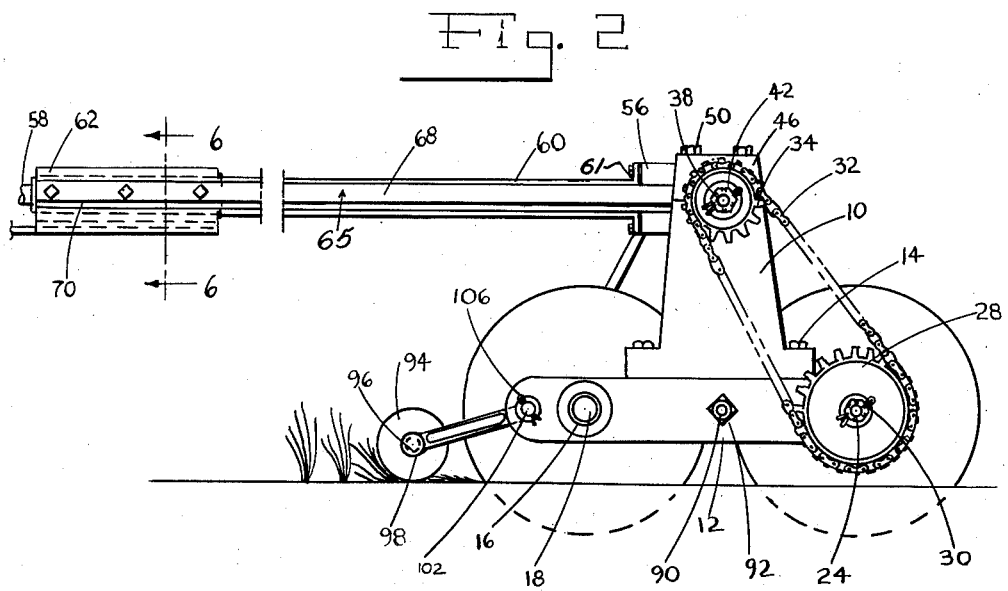
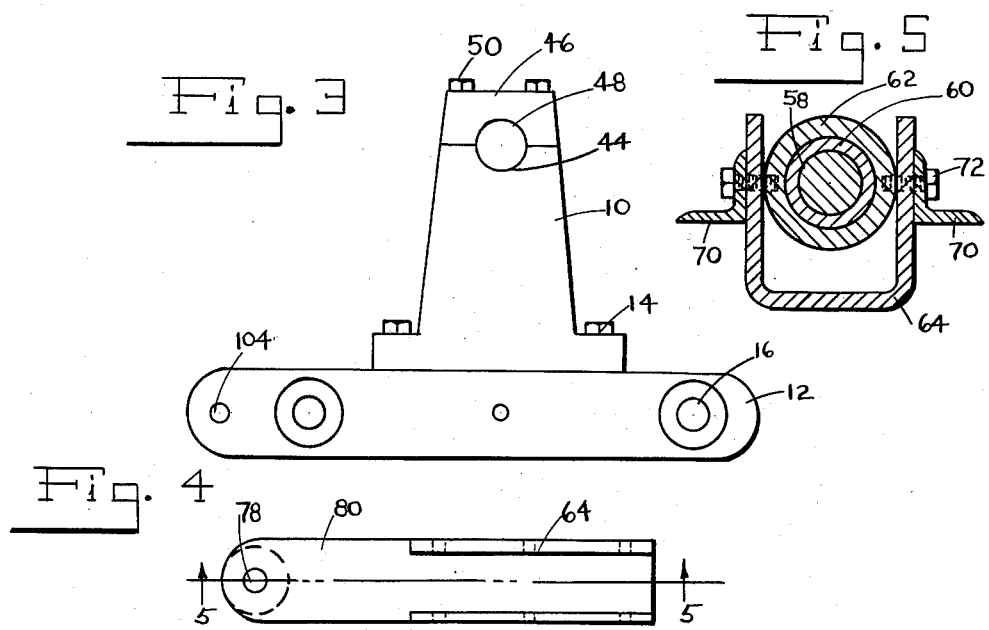
INVENTOR.
CLYDE M. LEAMAN
BY Victor J. Evans & Co.
ATTORNEYS Patented June 27, 1950

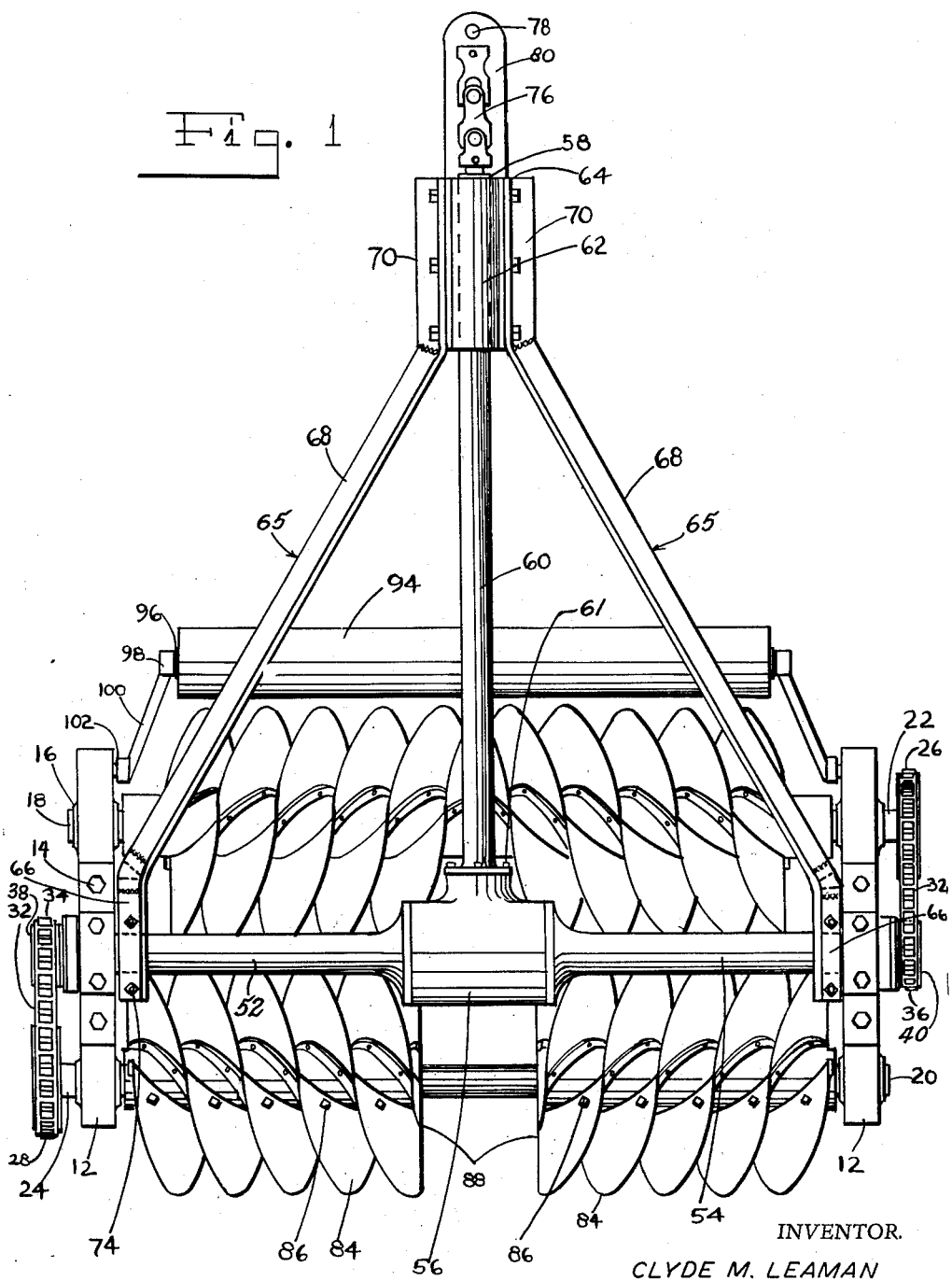

2,513,186

UNITED STATES PATENT OFFICE 2,513,186

ROTARY SPIRAL TILLER

Clyde M. Leaman, Wooster, Ohio

Application April 6, 1945, Serial No. 586,908

1 Claim. (Cl. 97—41)

This invention relates to a rotary spiral tiller which is used to supplant a plow in tilling the soil.

It is believed that by hitching a spring tooth harrow or Cultipacker to the rear of the device, the soil could be prepared for seeding in one operation.

The device is constructed for use with a tractor equipped with a power take off, and by rotating the blades twice as fast as the forward motion, two complete revolutions of the blades will be accomplished, whereas the blades would only make one revolution if the rotation thereof depended mainly on contact with the surface being tilled.

The main object of the invention, therefore, is to provide a device that will more efficiently till the surface than devices previously used for this purpose.

Another object of the invention is to provide a device that will give a shifting of the soil both to the right and left, thereby more thoroughly pulverizing and mixing the soil.

A further object of the invention is to provide a device having means associated with the blades for levelling all plant growth in the path of the blades in order that the plants may be thoroughly cut in small lengths which will mix with the soil and aid fertilization thereof.

Further objects and advantages of the invention will appear in the course of the following description of a preferred embodiment thereof, it being understood that changes in form and proportion and arrangement of the units thereof to adapt the same to varying conditions may be resorted to within the scope of the appended claim, without departing from the spirit of the invention.

In the drawings:

Fig. 1 is a top plan view of the device embodying the invention.

Fig. 2 is a side view of the same.

Fig. 3 is a detailed view of one of the standards of the frame of the device.

Fig. 4 is a top plan detailed view of the shaft housing support.

Fig. 5 is a sectional view on the line 5—5 of Fig. 4, and

Fig. 6 is a sectional view on the line 6—6 of Fig. 2.

Referring more in detail to the drawings, the numeral 10 indicates duplicate standards having duplicate axle supports 12 at right angles thereto, and secured thereon by machine bolts 14.

The axle supports 12 are provided with bearings 16 in which are journalled transverse parallel axles 18 and 20.

The end 22 of axle 18 and the end 24 of axle 20 are provided with large sprocket gears 26 and 28 respectively, which are retained on the axles by the usual nuts and cotter keys 30.

Sprocket chains 32 are trained over the gears 26 and 28 and smaller gears 36 and 34 respectively.

The gears 34 and 36 are retained on the axles 38 and 40 by the usual nuts and cotter keys 42.

The standards 10 are provided in the upper ends thereof with a semi-circular opening 44 and a housing retaining cap 46 having a mating semi-circular opening 48 therein, is secured to said standard by machine bolts 50.

Transversely mounted with respect to the standards 10 are axle housings 52 and 54 respectively, and a gear housing 56 is interposed between and joined to the housings 52 and 54 as shown.

Gears are mounted on the axles 38 and 40 and are adapted to mesh with a gear on the forwardly extended shaft 58 which is mounted in the housing 60 which is secured to the gear housing 56 by machine bolts 61.

The forward end of the housing 60 is mounted in a tubular sleeve 62 which is received in a U-shaped support and tractor hitch 64.

Secured to the housings 52 and 54 respectively are forwardly extending angle bars 65 having parallel rear straight portions 66 and inwardly inclined portions 68, which are interposed between and formed integral with forward straight portions 70 and the rear straight portions 66.

The forward portions 70 are secured to the U-shaped support 64 and sleeve 62 by machine bolts 72.

And the straight portions 66 are secured to the housings 52 and 54 adjacent the standards 10 by coupling bolts and nuts 74.

The forward end of the shaft 58 has a flexible universal drive sleeve 76 which is adapted for connection with the power take off of a tractor which can be used to pull the device.

An opening 78 provided in the forwardly extending end 80 of the U-shaped support 64 is adapted to receive the tractor hitch and a circular collar 82 is welded to the lower surface of the end 80 to reinforce the opening 78 and the end 80.

The axles 18 and 20 carry blades or pulverizing heads 84 which are volute in form and the concave surfaces of the blades are facing in opposite directions. The blades are arranged in groups as shown in the drawings with the blades facing in opposite directions to those on the same axle as well as those on the parallel axle.

The blades are secured to the axles by machine bolts 86.

The front group of blades convey the soil in an outward direction leaving a small depression in the soil where the blades meet at the center of the shaft. One group of blades give the soil a thrust to the right and the other group on the same axle thrust towards the left, thus their operation is balanced in respect to each other.

The rear group of blades are spaced apart in the rear as shown at 88, therefore the ends of the rear group extend beyond the ends of forward groups.

The grouping of the rear blades are such that their action is the reverse of the front group in order that the soil is thrown into the depression left by the front group of blades.

Therefore, the soil is thoroughly mixed and pulverized.

The standards 10 are retained in relatively spaced position by means of a brace 90 extending transversely thereof and retained in place by nuts 92.

Extending transversely of the device in parallel relation with the blades is a roller 94 which is rotatably mounted by means of stub axles 96 in bearings 98 in angularly inclined arms 100.

The arms 100 have stub axles 102 formed integral therwith that are journalled in bearings 104 in the axle supports 12.

This roller is intended to roll all plant growth level with the ground and thus hold it there while it is being cut in short lengths and mixed into the soil by the blades.

The stub axles 102 have apertured ends to receive a cotter key 106 therein to retain the axles 102 in position.

It is believed that the operation of the device is clear. However, to be sure that it is completely understood a brief description of the operation is hereby given.

With the device hitched to a tractor and the drive shaft connected to the power take off, the device is ready to till the soil.

As it is slowly drawn forward by the tractor the blades by the gear arrangement described rotate at twice the number of revolutions that would be given by contact with the ground, thereby more thoroughly pulverizing the soil than is usually done by similar devices that depend upon the ground for contact to rotate the blades.

With the roller laying down the plants in the path of the blades, the device is thought to accomplish the objects previously stated.

Having thus described the invention, what is claimed as new and desired to be secured by Letters Patent is:

A device of the character described, comprising a pair of vertically disposed, relatively spaced standards, parallel supports secured to the lower ends of said standards in vertical alinement therewith, parallel axles journalled in the supports connected to said standards, a gear housing having an axle housing extending outwardly thereof secured to said standards at the ends of said axles, means for supporting said axle housings on said standards, driving axles in said housings having gears of small radii secured to the ends thereof, gears of larger radii secured to the ends of said parallel axles, a chain drive connecting said small and said large radii gears, for rotating said axles, spiral pulverizing blades secured to said axles, the spirals of the blades on each axle being formed in groups in reversed relation to each other, and the opposing blades on each of said axles being in reversed relation to each other, with the peripheries of the spirals falling intermediate of the peripheries of the spirals on the opposite axle, an axle journalled at the forward ends of said supports, a roller on said axle forwardly of said blades in parallel relation to said blades, and means on said axle housings for connecting said standards to a tractor.

CLYDE M. LEAMAN.

REFERENCES CITED

The following references are of record in the file of this patent:

UNITED STATES PATENTS

| Number | Name | Date |
| --- | --- | --- |
| 217,491 | Schlag | July 15, 1879 |
| 281,140 | Ross | July 10, 1883 |
| 510,166 | Farmer | Dec. 5, 1893 |
| 982,944 | Fender | Jan. 31, 1911 |
| 1,240,542 | Cassell | Sept. 18, 1917 |
| 1,301,443 | Ike | Apr. 22, 1919 |
| 2,234,534 | Reno | Mar. 11, 1941 |
| 2,342,030 | Bagan | Feb. 15, 1944 |